US006282308B1

(12) United States Patent
Cossette

(10) Patent No.: US 6,282,308 B1
(45) Date of Patent: Aug. 28, 2001

(54) METHOD OF PROCESSING A DOCUMENT IN AN IMAGE-BASED DOCUMENT PROCESSING SYSTEM AND AN APPARATUS THEREFOR

(75) Inventor: Mario A. Cossette, Kitchener (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/287,787

(22) Filed: Apr. 7, 1999

(51) Int. Cl.[7] ................................................. G06K 9/00
(52) U.S. Cl. ............................................................ 382/137
(58) Field of Search ................................. 382/100, 101, 382/112, 115, 135, 137, 138, 139, 140, 141, 181, 254, 255, 312, 318; 396/310, 315, 316, 317; 348/175, 187, 234, 235, 236, 238; 359/798, 799; 250/201.1, 201.2, 559.01, 559.03, 559.07, 559.08, 559.1; 356/121, 124, 66; 209/3, 3.1, 3.2, 509, 534, 539, 547, 900, 938

(56) References Cited

U.S. PATENT DOCUMENTS

| 4,344,683 | | 8/1982 | Stemme | 396/317 |
|---|---|---|---|---|
| 4,740,818 | * | 4/1988 | Tsilibes et al. | 399/181 |
| 4,821,332 | * | 4/1989 | Durham | 382/140 |
| 4,825,246 | * | 4/1989 | Fukuchi et al. | 358/515 |
| 4,881,269 | | 11/1989 | Billiotte et al. | 382/147 |
| 4,882,498 | | 11/1989 | Cochran et al. | 250/559.04 |
| 5,021,978 | | 6/1991 | Stone et al. | 347/246 |
| 5,078,666 | | 1/1992 | Porret et al. | 493/1 |
| 5,163,012 | | 11/1992 | Wuhrl et al. | 382/112 |
| 5,317,654 | * | 5/1994 | Perry et al. | 382/101 |
| 5,323,473 | * | 6/1994 | Lau | 382/175 |
| 5,333,052 | | 7/1994 | Finarov | 356/369 |
| 5,530,759 | | 6/1996 | Braudaway et al. | 380/54 |
| 5,567,934 | * | 10/1996 | Zheng et al. | 250/237 |
| 5,602,939 | | 2/1997 | Hasiguchi et al. | 382/162 |
| 5,712,921 | | 1/1998 | Zabele | 382/112 |
| 5,719,948 | | 2/1998 | Liang | 382/112 |
| 5,822,053 | * | 10/1998 | Thraikill | 356/237.1 |
| 5,990,468 | * | 11/1999 | Cornuiejols | 250/208.1 |
| 6,005,965 | * | 12/1999 | Tsuda et al. | 382/145 |
| 6,088,133 | * | 7/2000 | Francis et al. | 358/473 |
| 6,155,604 | * | 12/2000 | Greene et al. | 358/473 |

* cited by examiner

Primary Examiner—Andrew W. Johns
Assistant Examiner—Shervin Nakhjavan
(74) Attorney, Agent, or Firm—Michael Chan

(57) ABSTRACT

An image-based document processing system includes an imaging camera which is disposed along one side of a document transport path. The imaging camera has an acquisition rate associated therewith. A selective illumination array is disposed along the document transport path and generates selective illumination data which is synchronized to the acquisition rate of the imaging camera. A controller is provided for (i) controlling the imaging camera to capture an image of the document as the document is being transported past the imaging camera, and (ii) controlling the imaging camera to capture an image of selective illumination data. The imaging camera may include a charge-coupled device (CCD) having a linear array of sensors. The imaging camera may capture the image of selective illumination data either after the image of the document is captured or before the image of the document is captured. Alternatively, the imaging camera may capture the image of selective illumination data while the image of the document is being captured to provide a composite image of the document and selective illumination data. The selective illumination array may provide light which is transmitted directly towards the imaging camera. Alternatively, the selective illumination array may provide light which is reflected and then transmitted towards the imaging camera.

22 Claims, 7 Drawing Sheets

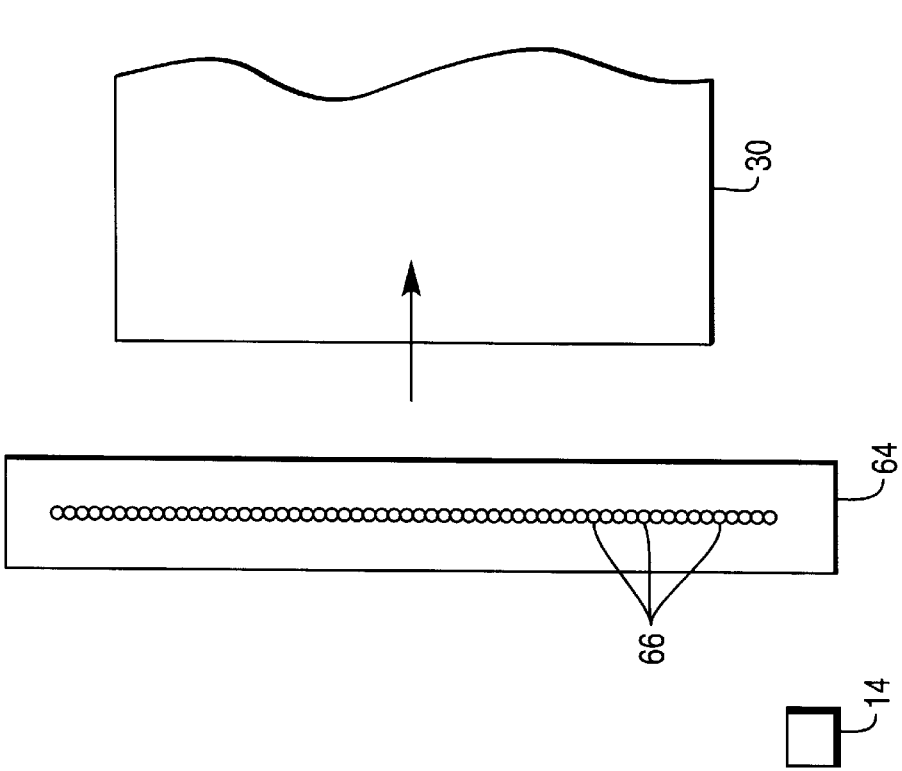
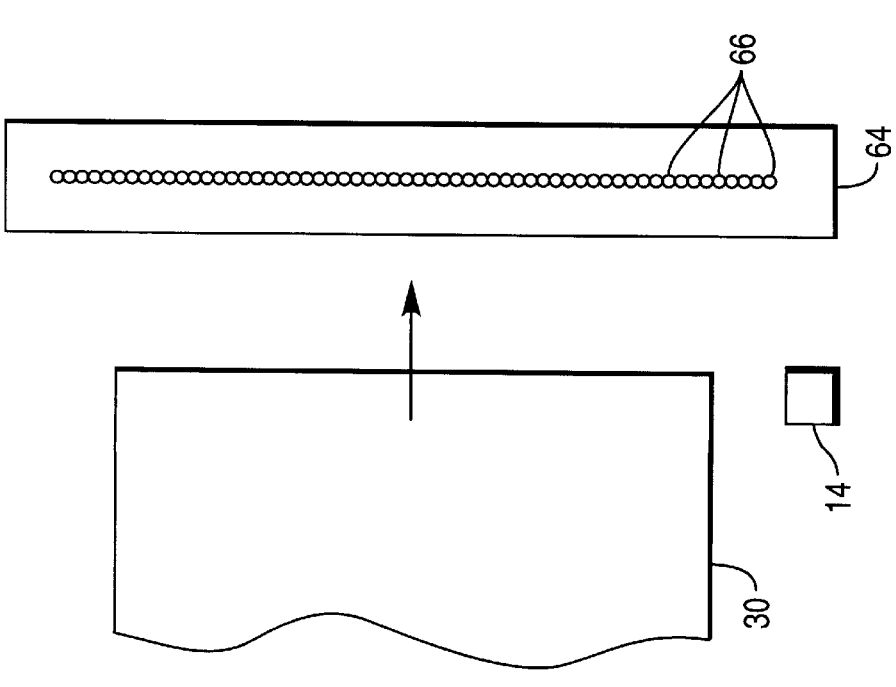

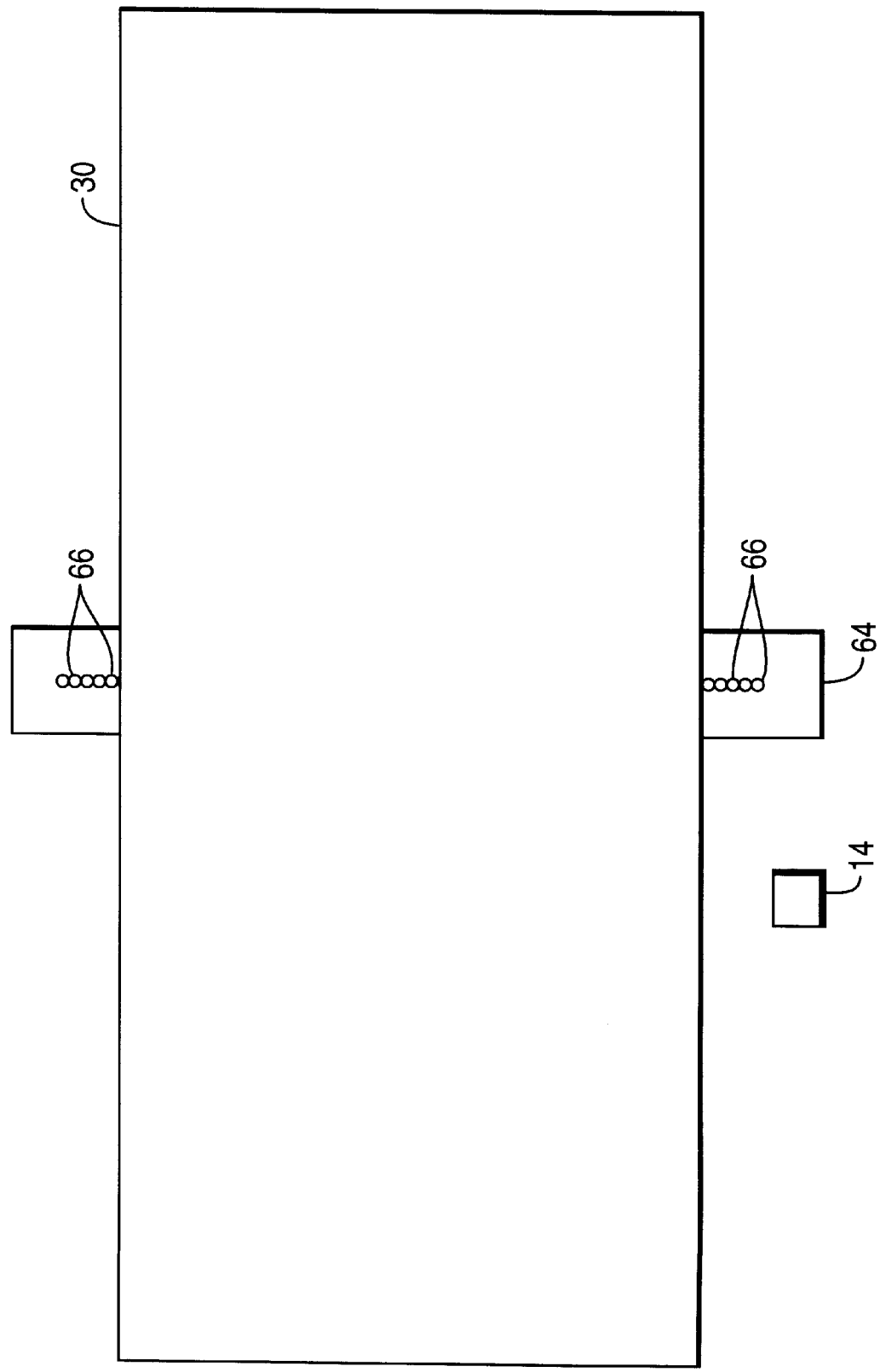

METHOD OF PROCESSING A DOCUMENT IN AN IMAGE-BASED DOCUMENT PROCESSING SYSTEM AND AN APPARATUS THEREFOR

BACKGROUND OF THE INVENTION

The present invention relates to image-based document processing systems, and is particularly directed to a method of processing a document in an image-based document processing system, such as an electronic image-based bank check processing system, and an apparatus therefor.

A typical electronic image-based bank check processing system includes an electronic imaging camera having a scan rate which is controlled to capture images of documents, such as bank checks, moving past the imaging camera along a document feed path. In an image-based bank check processing system, it is often desirable to establish quality and/or validity of each captured document image before processing the captured document image further downstream along the document feed path or archiving the captured document image. A known way to establish quality and/or validity of each captured document image is to visually inspect each image. However, since the number of documents is most often relatively large, visual inspection is usually impractical. Another known way to establish quality and/or validity of each captured document image is to apply real-time techniques in which general illumination parameters or pixel characteristics, for examples, are analyzed. However, since these real-time techniques are typically based upon statistical methods, many forms of system failure may not be immediately identifiable.

SUMMARY OF THE INVENTION

In accordance with one aspect of the present invention, an apparatus is provided for processing a document transported along a document transport path. The apparatus comprises illumination means for generating selective illumination data. The apparatus further comprises an imaging camera for (i) capturing an image of a document while the document is being transported along the document transport path, and (ii) capturing an image of selective illumination data. The imaging camera may capture the image of the selective illumination data either after the image of the document is captured or before the image of the document is captured. Alternatively, the imaging camera may capture the image of the illumination data while the image of the document is being captured to provide a composite image of the document and selective illumination data.

In accordance with another aspect of the present invention, a method of processing a document transported along a document transport path in an image-based document processing system including an imaging camera having an acquisition rate comprises the steps of (a) capturing an image of a document while the document is being transported along the document transport path, and (b) capturing an image of selective illumination data which is synchronized to the acquisition rate of the camera.

In accordance with another aspect of the present invention, an apparatus is provided for processing a document transported along a document transport path. The apparatus comprises an imaging camera having an acquisition rate and disposed along the document transport path. Illumination means is disposed along the document transport path and is provided for generating selective illumination data which is synchronized to the acquisition rate of the imaging camera. Control means is provided for controlling the illumination means to generate selective illumination data while the document is being transported along the document transport path so that the imaging camera can capture a composite image of the document and the selective illumination data as the document is being transported along the document transport path past the imaging camera. The illumination means may provide light which is transmitted directly towards the imaging camera. Alternatively, the illumination means may provide light which is reflected and then transmitted towards the imaging camera.

In accordance with yet another aspect of the present invention, a method of processing a document transported along a document transport path in an image-based document processing system including an imaging camera having an acquisition rate comprises the steps of (a) generating selective illumination data which is synchronized to the acquisition rate of the imaging camera, and (b) capturing a composite image of the document and the selective illumination data generated in step (a) while the document is being transported along the document transport path.

In accordance with still another aspect of the present invention, an image-based document processing system comprises means defining a document transport path along which a document can be transported. An imaging camera is disposed along one side of the document transport path and has an acquisition rate associated therewith. Illumination means is disposed along the document transport path and is provided for generating selective illumination data which is synchronized to the acquisition rate of the imaging camera. Control means is provided for (i) controlling the imaging camera to capture an image of the document as the document is being transported past the imaging camera, and (ii) controlling the imaging camera to capture an image of selective illumination data. The imaging camera may capture the image of selective illumination data either after the image of the document is captured or before the image of the document is captured. Alternatively, the imaging camera may capture the image of selective illumination data while the image of the document is being captured to provide a composite image of the document and selective illumination data.

In accordance with still another aspect of the present invention, an image-based document processing system comprises means defining a document transport path along which a document can be transported. An imaging camera is disposed along one side of the document transport path and has an acquisition rate associated therewith. A selective illumination array is disposed along the document transport path and is provided for generating selective illumination data which is synchronized to the acquisition rate of the imaging camera. A controller is provided for controlling the selective illumination array to generate selective illumination data such that the imaging camera can capture a composite image of the document and the selective illumination data as the document is being transported past the imaging camera along the document transport path. The imaging camera may be disposed on one side of the document transport path and the selective illumination array may be disposed along the opposite side of the document transport path facing the imaging camera.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view looking generally in the direction of line 3—3 in FIG. 2 and showing a selective illumination array in the image capture subsystem of FIG. 2 and a bank check in the vicinity of the selective illumination array;

FIGS. 4 and 5 are views similar to FIG. 3 and showing the bank check in different positions relative to the selective illumination array;

DETAILS OF THE INVENTION

Figure 1:
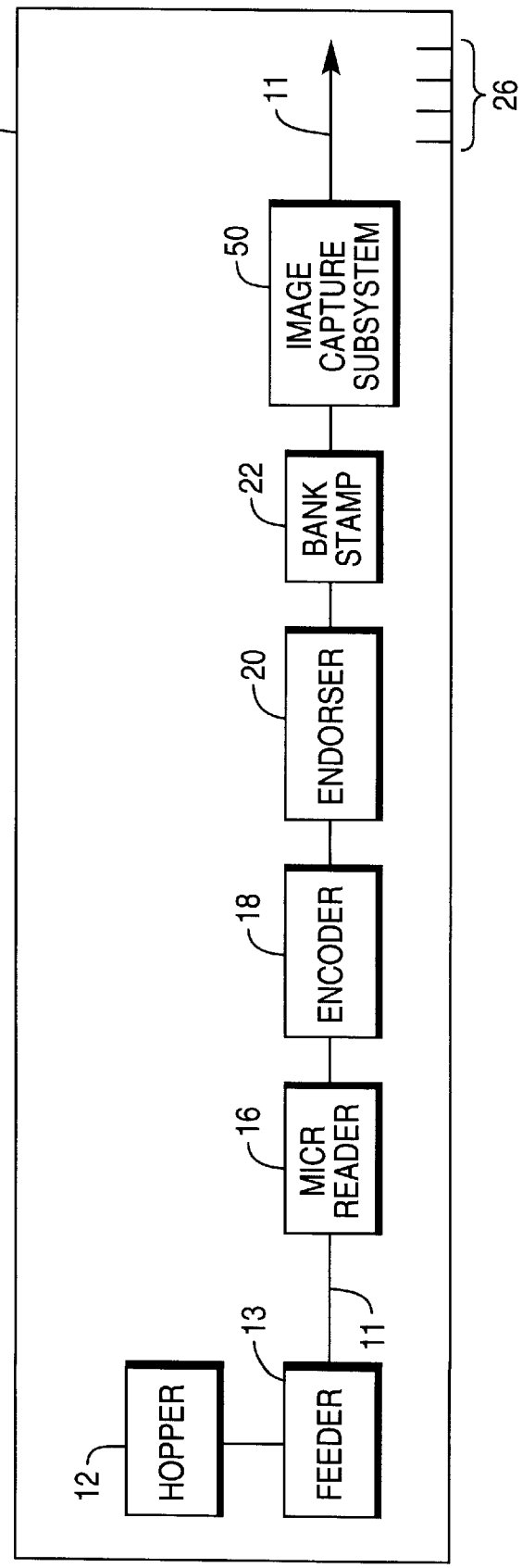
FIG. 1 is a schematic view of a bank check processing system embodying the present invention.

The present invention is directed to a method of processing a document in an image-based document processing system and an apparatus therefor. The specific construction and use of the image-based document processing system may vary. By way of example, an image-based document processing system in the form of an electronic image-based bank check processing system 10 is illustrated in FIG. 1. The bank check processing system 10 may be, for example, a sorting machine or a proof machine wherein documents such as bank checks are processed in a data processing operation.

As shown in FIG. 1, the bank check processing system 10 has a document track which defines a document transport path 11 along which documents, such as bank checks, can move. The document transport path 11 has an upstream end and a downstream end. The bank check processing system 10 includes a hopper 12 into which a stack of bank checks (not shown) are placed. A document feeder 13 adjacent the hopper 12 selectively feeds or drives each check from the stack of bank checks in the hopper to transport the check from the upstream end to the downstream end along the document transport path 11 to sorting bins 26 located at the end of the document transport path.

The bank check processing system 10 further includes a MICR reader 16 which reads a MICR codeline from each bank check being processed in a known manner. An OCR reader may be used in place of the MICR reader 16 depending upon on the particular application. An encoder 18 encodes any missing fields on each check. An endorser 20 applies an endorsement in a known manner to the checks. A bank stamp 22 stamps each check to identify the bank institution processing the check. The structure and operation of MICR readers, OCR readers, encoders, endorsers, and bank stamps are well known and, therefore, will not be described.

Figure 2:
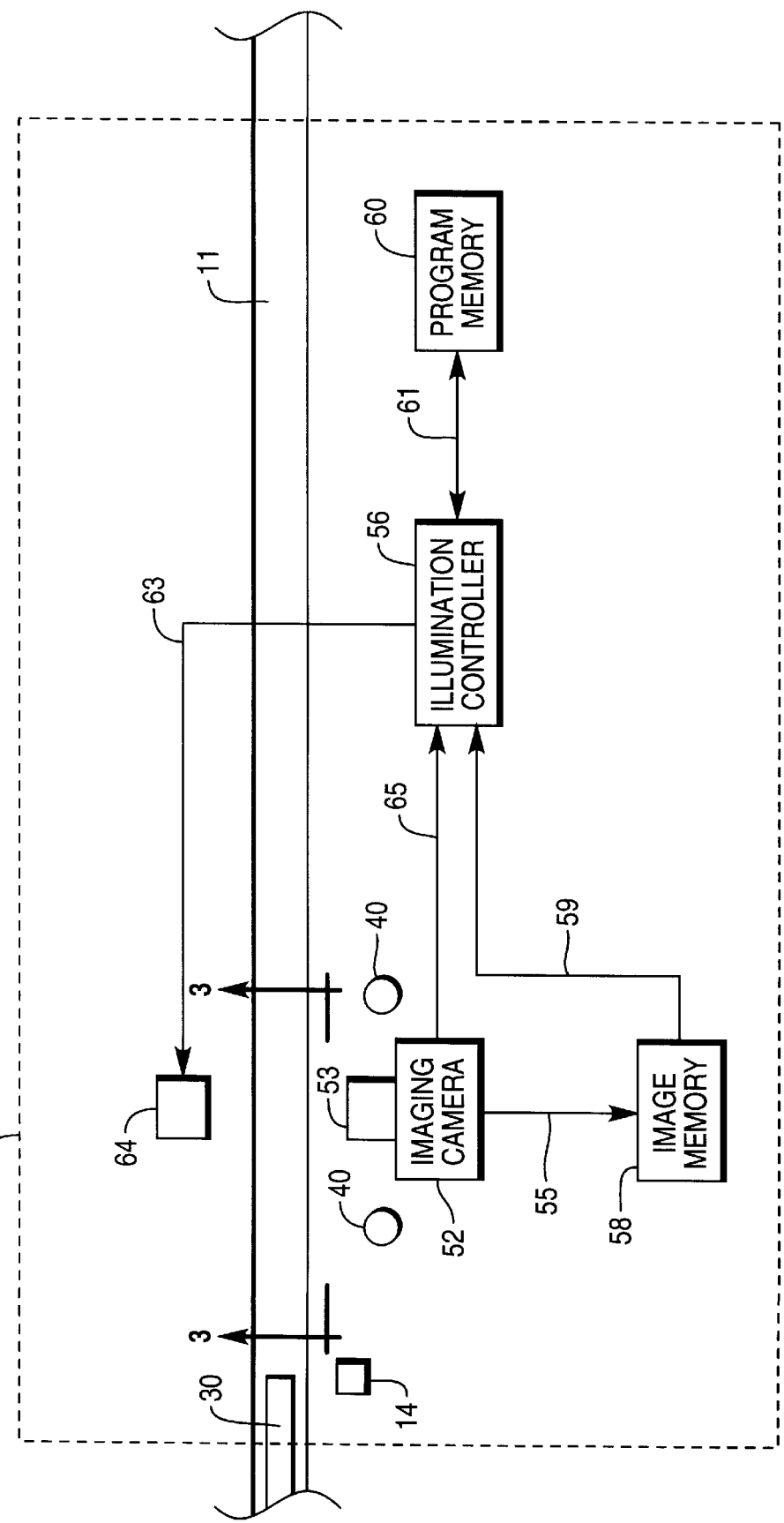
FIG. 2 is a schematic view of an image capture subsystem used in the bank check processing system of FIG. 1.

Referring to FIGS. 1 and 2, the bank check processing system 10 further includes an image capture subsystem 50 located along the document transport path 11. The image capture subsystem 50 captures an image of each check for the purpose of establishing quality and/or validating data associated with the check and/or to archive the image of the check.

As shown in FIG. 2, the image capture subsystem 50 includes a number of lamps 40 located on one side of the document transport path 11. The lamps 40 provide light which illuminates a bank check 30 which is being transported from the upstream end of the document transport path 11 towards the downstream end of the document transport path. Light from the lamps 40 is reflected from the check 30 to provide an image of the check.

The image capture subsystem 50 further includes an electronic imaging camera 52 which is located along the same side of the document transport path 11 as the lamps 40. The camera 52 includes an optical system 53 having a number of lenses through which the image of the check 30 is magnified to provide a magnified image of the check. The magnified image may be either a reduction or an enlargement of the check 30. The camera 52 may include a charge-coupled device (CCD) or other suitable element having a linear array of sensors which scan the magnified image of the check 30. A trigger sensor 14 is located along the document transport path 11 upstream of the camera 52. The trigger sensor 14 provides a trigger signal when the leading edge of the check 30 moving along the document transport path 11 moves past the trigger sensor. Accordingly, the trigger sensor 14 provides a trigger signal when the leading edge of the check 30 moving along the document transport path 11 is about to move in front of the camera 52.

As the check 30 moves in front of the camera 52 and continues to move past the camera towards the downstream end of the document transport path 11, the camera captures the image of the check 30. More specifically, as the check 30 moves past the camera 52, the camera may generate successive scan lines of pixels to produce a matrix of pixels associated with the check. Each pixel is usually represented by gray scale image data in which a particular gray level is associated with the pixel. For example, each pixel may have any one of 256 gray levels associated therewith, ranging from completely black (level zero) to completely white (level 255). Alternatively, the camera 52 may be of the type which captures color image data associated with the check 30.

In accordance with the present invention, the image capture subsystem 50 further includes a selective illumination array 64 which is located along one side of the document transport path 11 facing opposite the optical system 53 of the camera 52, as shown in FIG. 1. As shown in FIG. 3, the illumination array 30 includes a number of light emitting diodes (LEDs) 66 which are aligned vertically to form a vertical array. The actual size of each of the LEDs 66 is smaller than as shown in FIG. 3. However, for purposes of illustration, the size of each of the LEDs 66 is shown exaggerated (i.e., larger) in FIG. 3. It is contemplated that the illumination array 64 may include any number of LEDs which are vertically aligned.

The image capture subsystem 50 further includes an illumination controller 56 which communicates via line 61 with a program memory 60. The controller 56 also monitors the trigger sensor 14 for the presence of a trigger signal. The camera 52 provides image data on line 55 which is stored in an image data memory 58 to provide a stored digitized image of the check 30. The camera 52 also provides a scan rate signal on line 65 which is monitored by the controller 56. The controller 56 reads image data on line 59 from the image data memory 58 and compares this image data with predetermined image data which is stored in the program memory 60 to provide a basis upon which image system integrity may be analyzed. For example, proper magnification of the optical system 53 of the camera 52, unobstructed clarity of the optical system of the camera, or focus of the optical system of the camera, may be analyzed.

In particular, the controller 56 may include a microcomputer which communicates with the program memory 60. Suitable microcomputers and memories are readily available in the marketplace. Their structure and operation are well known and, therefore, will not be described. Alternatively, the controller 56 may include dedicated hardware circuitry for the particular application desired.

The controller 56 may also monitor output signals from certain components, such as the MICR reader 16, the encoder 18, the endorser 20, and/or the bank stamp 22, disposed along the document transport path 11. Information from these components is utilized in accordance with a number of control programs stored in the program memory 60.

Figure 6:
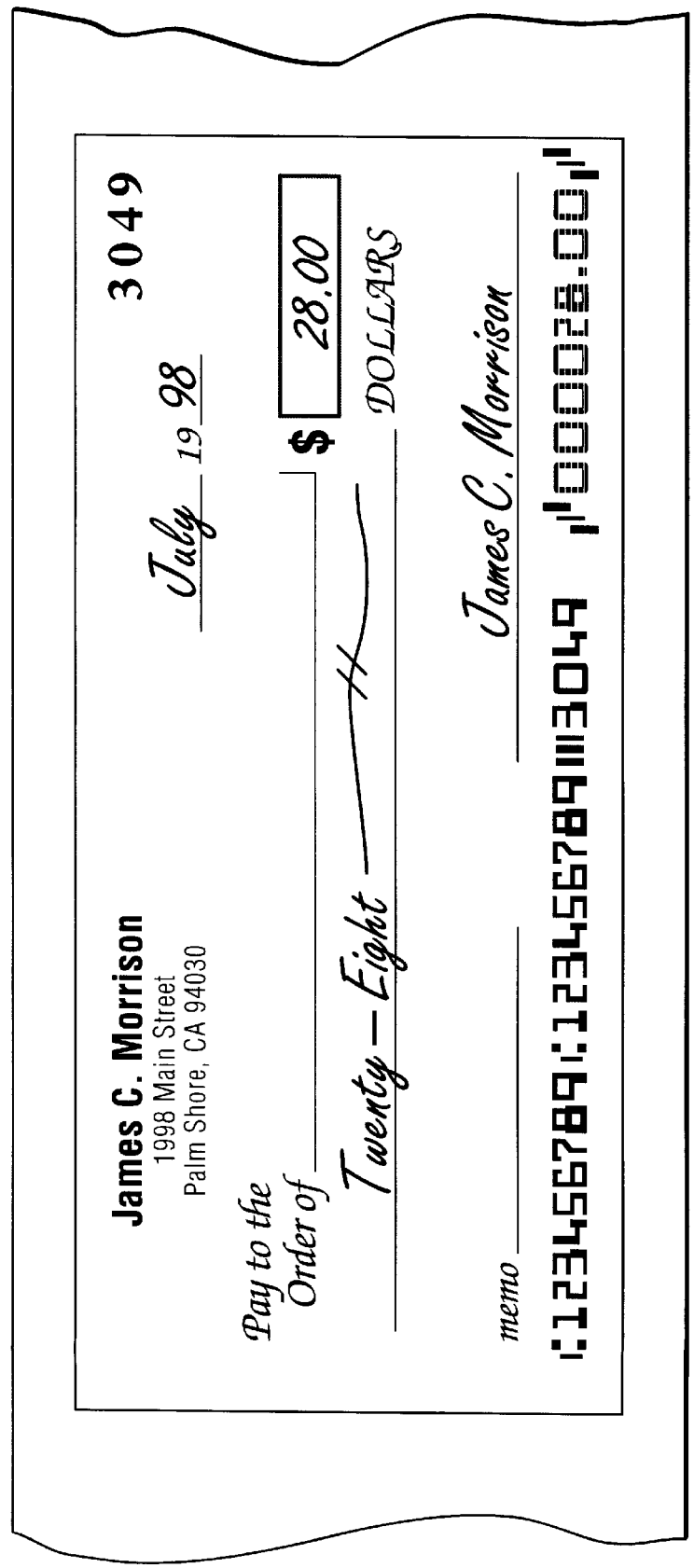
FIG. 6 is a view of an image of the bank check which has been captured by the image capture subsystem of FIG. 2.

As already mentioned hereinabove, the trigger sensor 14 provides a trigger signal when the leading edge of the check 30 moves past the trigger sensor, as shown in FIGS. 2 and 3. The controller 56 monitors the trigger sensor 14 for presence of a trigger signal, and provides a control signal on line 63 to control operation of the illumination array 64. The controller 56 precisely synchronizes the control signal on line 63 to the acquisition rate of the camera 52 as monitored on line 65. The camera 52 captures an image of the check 30 as the check continues moving downstream along the document transport path 11 past the camera 52, such as shown in FIG. 4. The camera 52 continues capturing the image of the check 30 until the trailing edge of the check has moved past the camera, such as shown in FIG. 5. A complete captured image of the check 30 is shown in FIG. 6.

After the trailing edge of the check 30 has moved past the camera 52, as shown in FIG. 5, the controller 56 controls the selective illumination array 64 to sequence the array of LEDs 66 in synchronization with the acquisition rate of the camera 52, so as to provide a precise optical test pattern/sequence which is also captured as an image by the camera 52. The precise optical test pattern/sequence may be one of a number of known expected patterns/sequences which is distinct from the ambient illumination from the lamps 40. The particular optical test pattern/sequence provided depends upon the particular control program stored in the program memory 60 which the controller 56 executes.

Figure 7A:
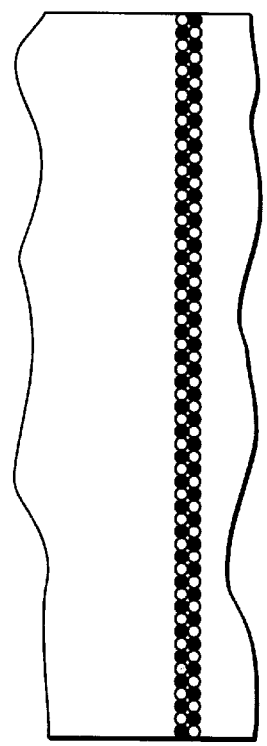
FIG. 7 is a view of an image of selective illumination data which has been captured by the image capture subsystem of FIG. 2 after the image of the bank check shown in FIG. 5 has been captured.
Figure 7B:
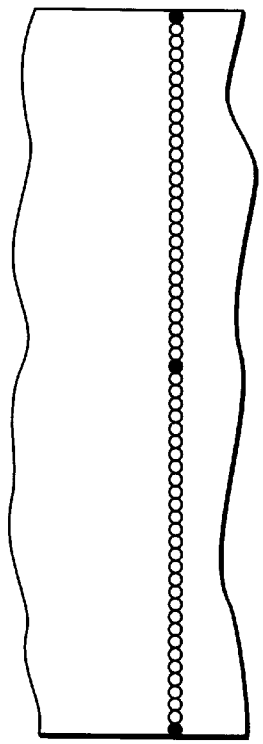

Examples of optical test patterns provided by the LEDs 66 are illustrated in FIGS. 7A and 7B. The optical test pattern of FIG. 7A may be used to verify that all pixels associated with the camera 52 have responded correctly to ON and OFF states. Any grease, ink, or other translucent contaminants on the optical system 53 of the camera 52 would tend to refract illumination from adjacent pixels. Such a condition of the optical system 53 of the camera 52 may be detected by comparing the test pattern of FIG. 7A as captured in the image data memory 58, with predetermined image data or parameters stored in program memory 60, for example.

The optical test pattern of FIG. 7B may be used to verify that the magnification factor associated with the optical system 53 of the camera 52 is correct. This verification is accomplished by counting relative pixel positions of illuminated areas as captured in the image data memory 58, and comparing this count to predetermined target values stored in the program memory 60, for example. The pattern of FIG. 7B may also be used to determine vertical position of the camera 52 relative to a known position of the selective illumination array 64 so that vertical height adjustment of the camera can be made. The vertical height adjustment of the camera 52 may be made either in real-time or during initial set-up. The pattern of FIG. 7B may also be used to verify proper focus of the optical system 53 of the camera 52.

Figure 7C:
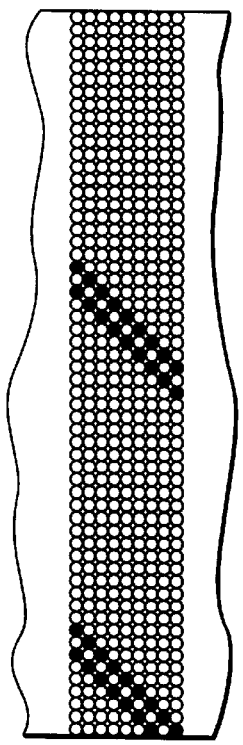

The optical test sequence of FIG. 7C may be used to determine the extent of usable field of view for a particular magnification factor of the camera 52. The optical test sequence of FIG. 7C may also be used to determine magnification linearity across the entire field of view of the camera 52 by comparing apparent changes in adjacent pixel positions. Further, the optical test sequence of FIG. 7C may be used to determine sensitivity response of the camera 52 to single and/or multiple illumination points.

It should be apparent that an optical test pattern/sequence, such as shown in FIGS. 7A, 7B, or 7C, is generated and captured as an image by the camera 52 between adjacent checks moving along the document transport path 11. The image of the optical test pattern/sequence is generated and captured for a number of different purposes as already described hereinabove.

Figure 8:
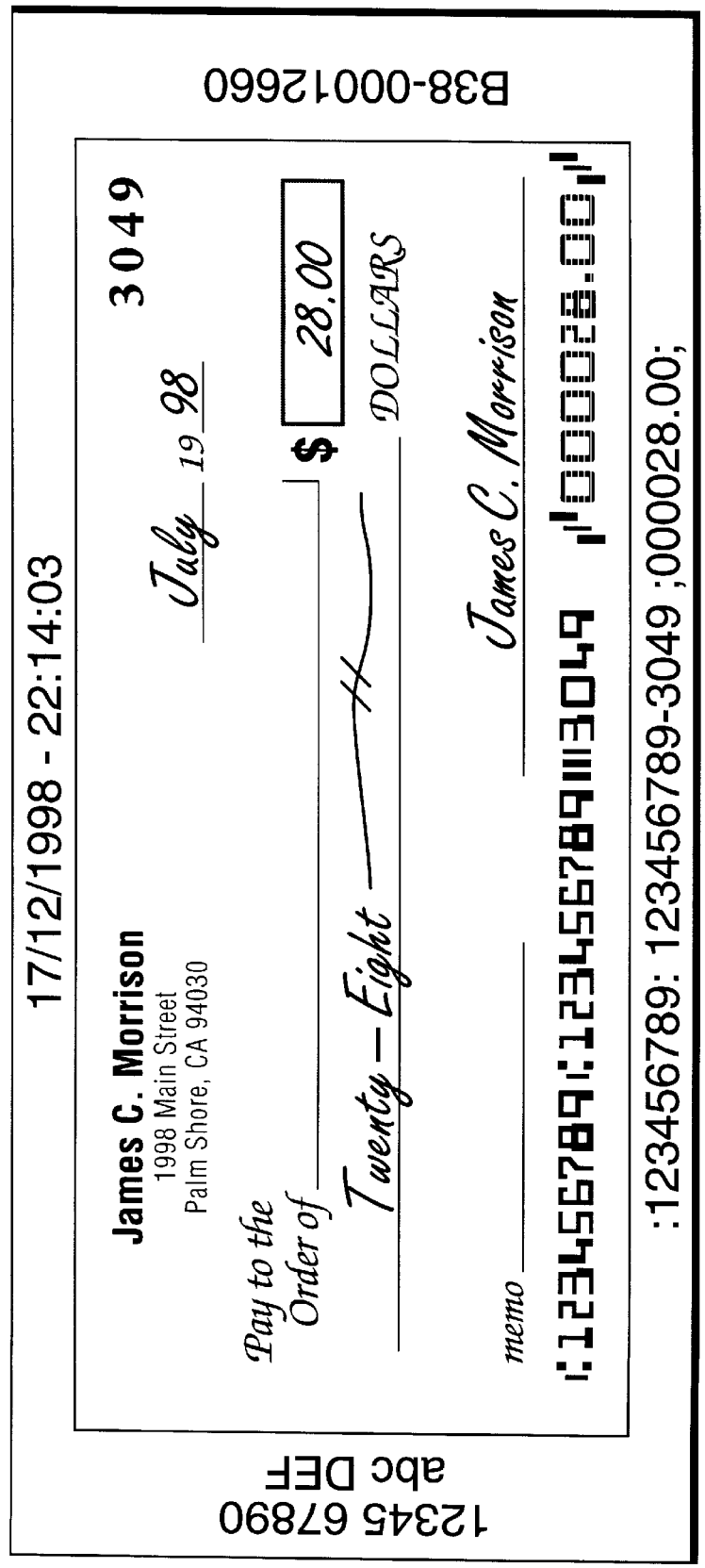
FIG. 8 is a view of a composite image of the bank check and selective illumination data which has been captured by the image capture subsystem of FIG. 2.

It is contemplated that the LEDs 66 of the illumination array 64 may also be controlled to provide typical embedded information in a captured image of a check as the check is moving past the camera 52 to provide a composite image of the check and the embedded information. Such a composite image of a check and embedded information is shown in FIG. 8. When the composite image such as shown in FIG. 8 is generated, the controller 56 obtains information from other sources, such as the MICR reader 16, to control operation of the illumination array 64. In this case, the controller 56 need not analyze the captured image data from the image data memory 58, but only control operation of the illumination array 64. The composite image may contain information along a leading edge, a top edge, a bottom edge, and a trailing edge of the image.

For example, the leading edge of the composite image may contain an item batch and consecutive document identification number, as shown in FIG. 8. The top edge of the composite image may contain date and time of item capture, as shown in FIG. 8. Alternatively, the top edge of the composite image may contain information associated with name and location of the processing center, or information associated with identification of the image capture subsystem 50. The bottom edge of the composite image may contain codeline information associated with the check 30, such as shown in FIG. 8. The trailing edge of the composite image may contain security information in machine-readable format, for example. The machine-readable format may be in either dot or barcode, for examples. Alternatively, the trailing edge of the composite image may contain an image authentication code, codeline data associated with the check, an image file name, and/or parameters associated with the ambient illumination provided for the camera 52 by the lamps 40. For example, these parameters may indicate whether ultraviolet, infrared, or visible light is being used to illuminate items moving before the camera 52 along the document transport path 11.

Although the above describes the selective illumination array 64 as being located directly across the document transport path 11 from the camera 52 to transmit light directly into the optical system 53 of the camera, it is contemplated that a selective illumination array may be located on the same side of the document transport path 11 with the camera such that light is initially directed towards the item and then reflected from the item towards the optical system of the camera.

It is contemplated that the camera 52 may be of a type which is different from the type described hereinabove. For example, the camera 52 may include a CCD or other suitable element having an area array of sensors instead of a linear array of sensors. If an area array of sensors is used, then a frame rate would be associated therewith instead of a scan rate which is more particularly associated with a linear array of sensors. The scan rate of a camera or the frame rate of a camera may be referred to as an acquisition rate associated with the particular type of camera. Also, if an area array of sensors is used, then a two-dimensional illumination array may be used in place of the previously described selective illumination array 64 which is vertically aligned in one dimension.

It is also contemplated that selective illumination data may be generated using other sources. For example, a remotely mounted assembly having suitable fiber optical conduits which direct selective illumination data to the camera 52 may be used. Alternatively, a remotely mounted assembly having a scanning laser source which directs selective illumination data to the camera 52 may be used.

A number of advantages result by processing documents such as bank checks in accordance with the present invention as just described hereinabove. One advantage is that process diagnostics for the camera 52 and related optical components is enhanced and simplified. Another advantage is that a significantly greater level of confidence is provided about the quality and/or validity of captured item images. Still another advantage is that data integrity and image security are maintained when parametric information associated with the particular check is embedded in a composite image, such as the composite image of the check 30 and embedded information shown in FIG. 8.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. An apparatus for processing a document transported along a document transport path, the apparatus comprising:
    illumination means for generating selective illumination data; and
    an imaging camera for (i) capturing an image of a document while the document is being transported along the document transport path, and (ii) capturing an image of selective illumination data.

2. An apparatus according to claim 1, wherein the imaging camera captures the image of selective illumination data after the image of the document is captured.

3. An apparatus according to claim 1, wherein the imaging camera captures the image of selective illumination data before the image of the document is captured.

4. An apparatus according to claim 1, wherein the imaging camera captures the image of selective illumination data while the image of the document is being captured to provide a composite image of the document and selective illumination data.

5. A method of processing a document transported along a document transport path in an image-based document processing system including an imaging camera having an acquisition rate, the method comprising the steps of:
    (a) capturing an image of a document while the document is being transported along the document transport path; and
    (b) capturing an image of selective illumination data which is synchronized to the acquisition rate of the camera.

6. A method according to claim 5, wherein step (b) includes the step of:
    (b-1) capturing the image of selective illumination data before the image of the document is captured.

7. A method according to claim 5, wherein step (b) includes the step of:
    (b-1) capturing the image of selective illumination data after the image of the document is captured.

8. A method according to claim 5, wherein step (b) includes the step of:
    (b-1) capturing the image of selective illumination data while the image of the document is being captured.

9. An apparatus for processing a document transported along a document transport path, the apparatus comprising:
    an imaging camera having an acquisition rate and disposed along the document transport path;
    illumination means disposed along the document transport path and for generating selective illumination data which is synchronized to the acquisition rate of the imaging camera; and
    control means for controlling the illumination means to generate selective illumination data while the document is being transported along the document transport path so that the imaging camera can capture a composite image of the document and the selective illumination data as the document is being transported along the document transport path past the imaging camera.

10. An apparatus according to claim 9, wherein the illumination means provides light which is transmitted directly towards the imaging camera.

11. An apparatus according to claim 9, wherein the illumination means provides light which is reflected and then transmitted towards the imaging camera.

12. A method of processing a document transported along a document transport path in an image-based document processing system including an imaging camera having an acquisition rate, the method comprising the steps of:
    (a) generating selective illumination data which is synchronized to the acquisition rate of the imaging camera; and
    (b) capturing a composite image of the document and the selective illumination data generated in step (a) while the document is being transported along the document transport path.

13. An image-based document processing system comprising:
    means defining a document transport path along which a document can be transported;
    an imaging camera disposed along one side of the document transport path and having an acquisition rate associated therewith;
    illumination means disposed along the document transport path and for generating selective illumination data which is synchronized to the acquisition rate of the imaging camera; and
    control means for (i) controlling the imaging camera to capture an image of the document as the document is being transported past the imaging camera, and (ii) controlling the imaging camera to capture an image of selective illumination data.

14. An image-based document processing system according to claim 13, wherein the imaging camera captures the image of selective illumination data after the image of the document is captured.

15. An image-based document processing system according to claim 13, wherein the imaging camera captures the image of selective illumination data before the image of the document is captured.

16. An image-based document processing system according to claim 13, wherein the imaging camera captures the image of selective illumination data while the image of the document is being captured to provide a composite image of the document and selective illumination data.

17. An image-based document processing system according to claim 13, wherein the imaging camera includes a charge-coupled device (CCD) having a linear array of sensors.

18. An image-based document processing system comprising:

means defining a document transport path along which a document can be transported;

an imaging camera disposed along one side of the document transport path and having an acquisition rate associated therewith;

a selective illumination array disposed along the document transport path and for generating selective illumination data which is synchronized to the acquisition rate of the imaging camera; and a controller for controlling the selective illumination array to generate selective illumination data such that the imaging camera can capture a composite image of the document and the selective illumination data as the document is being transported past the imaging camera along the document transport path.

19. An image-based document processing system according to claim 18, wherein the imaging camera is disposed on one side of the document transport path and the selective illumination array is disposed along the opposite side of the document transport path facing the imaging camera.

20. An image-based document processing system according to claim 18, wherein the selective illumination array provides light which is transmitted directly towards the imaging camera.

21. An image-based document processing system according to claim 18, wherein the selective illumination array provides light which is reflected and then transmitted towards the imaging camera.

22. An image-based document processing system according to claim 18, wherein the imaging camera includes a charge-coupled device (CCD) having a linear array of sensors.

* * * * *